Patented Aug. 12, 1952

2,606,902

UNITED STATES PATENT OFFICE 2,606,902

ETHYLENEIMINO DERIVATIVES OF PHOSPHORIC ACID AND METHOD OF PREPARING THE SAME

Robert P. Parker, Somerville, Doris R. Seeger, Bound Brook, and Erwin Kuh, New Brunswick, N. J., assignors to American Cyanamid Company, New York, N. Y., a corporation of Maine No Drawing. Application July 25, 1951,
Serial No. 238,585

12 Claims. (Cl. 260—239)

This invention relates to the preparation of new organic compounds. More particularly, it relates to N,N',N''-triethylenephosphoric acid triamides substituted on a ring carbon of the ethylenimine rings and methods for their preparation.

It is known in the prior art to prepare phosphoric acid triamides containing certain substituents on the nitrogen atoms (G. M. Kosolopoff; Organophosphorous Compounds, 1950, pages 312–313).

The compounds of the present invention, in contrast to those of the prior art, are N,N',N''-triethylenephosphoric triamides which contain substituents on a ring carbon atom of the ethylenimine rings. These compounds may be illustrated by the following general formula:

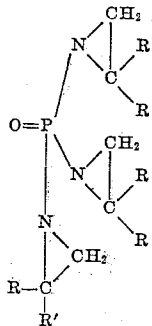

in which R represents hydrogen or a radical of the aliphatic, cycloaliphatic, aliphatic-aromatic or aromatic series and R' is a radical of the aliphatic or aromatic series.

The compounds of the present invention possess chemically reactive ethylenimine rings making them useful as textile chemicals; they may be polymerized to yield new plastics. However, it is surprising that the compounds which contain the highly reactive substituted ethylenimine ring are so stable that they may be used as therapeutic agents.

The compounds of the present invention are, in general, low melting crystalline solids to liquids. Most of them are soluble in water and in the usual organic solvents. Many of them possess marked lipid-solubility.

The compounds of the present invention are prepared by starting with a trihalophosphoric acid such as phosphorous oxychloride or phosphorous oxybromide which is first reacted with a molecular equivalent of a C-substituted ethylenimine of the formula:

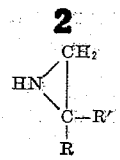

in which R and R' are as defined above. The intermediate N-(substituted ethylene) amidodihalophosphoric acid obtained in this reaction is then reacted with two molecular equivalents of an ethylenimine to produce the desired triamides. These general reactions may be illustrated by the following equations:

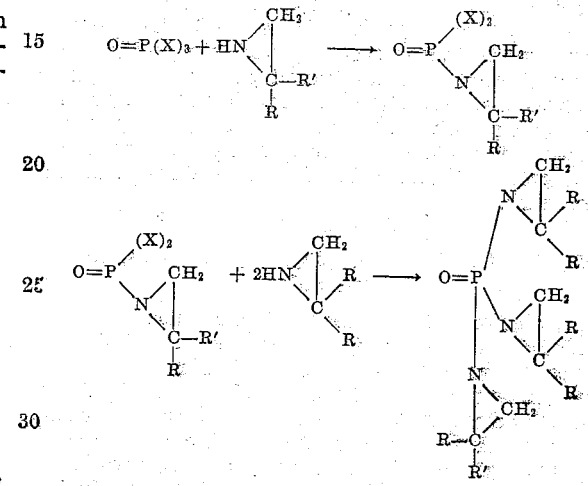

in which X is halogen and R and R' are as defined above. In the above reaction the C-substituted ethylenimine used in the first step can be a compound such as 2-methylethylenimine; 2-ethylethylenimine; 2-propylethylenimine; 2-hexylethylenimine; 2,2-diethylethylenimine; 2-propyl-2-phenylethylenimine; 2-phenylethylenimine; etc. Ethylenimines which can be used in the second step include, for example, ethylenimine itself and C-substituted ethylenimines such as are illustrated above for the first step. When all these rings are alike, it is merely necessary to react the trihalophosphoric acid with three molecules of the particular C-substituted ethylenimine. These ethylenimine intermediates may be prepared by known procedures, such as by ring closure with an alkali metal hydroxide of the corresponding 2-haloethylamine or sulfuric ester of the corresponding 2-hydroxyethylamine.

The reaction to prepare the compounds of the present invention may be carried out in a substantially aqueous solution. It is also necessary to have present an acid acceptor to neutralize the hydrohalide acid formed. The acid acceptor may be an alkaline substance such as an alkali metal carbonate or bicarbonate. The reaction can also be carried out in an organic solvent such as benzene, ether, dioxane and the like, and under these circumstances, the acid acceptor may be a tertiary amine such as triethylamine, N-ethylmorpholine or pyridine. Isolation of the product from organic medium may be accomplished by filtration of the tertiaryamine hydrochloride salt and crystallization from the organic solvent or by evaporation of the organic solvent. If prepared in aqueous medium, some members may be isolated by filtration; others must be extracted from the aqueous solution by the use of organic solvents. The procedure will vary with the individual members.

The reaction is generally carried out at a temperature within the range of 0° C. to about 60° C. At this temperature range the reaction is usually complete within a period of 30 minutes to 5 to 6 hours.

The following examples illustrate the preparation of phosphoric triamides of the present invention. All parts are by weight unless otherwise indicated.

EXAMPLE 1

N,N',N''-tris-(1-methylethylene) phosphoric triamide

To a mixture of 38.5 parts of sodium carbonate, 19.5 parts of 2-methylethylenimine and 350 parts of water, 17 parts of phosphorous oxychloride is added during 40 minutes at 4°–5° C. The temperature is then raised very gradually to 25° and kept there for an additional two and one-half hours. The reaction mixture is then clarified and extracted with chloroform. After drying, the solvent is removed under reduced pressure and the product is distilled at 90°–92° at 0.15–0.3 mm. mercury.

EXAMPLE 2

N,N',N''-tris-(1,1 - dimethylethylene) phosphoric triamide

A solution of 22.5 parts of phosphorous oxychloride in 65 parts of dry benzene is added slowly to a solution of 32.2 parts of 2,2-dimethylethylenimine and 51.8 parts of triethylamine in 200 parts of dry benzene at 5°–10° C., and the mixture is then stirred for three hours. After filtration of triethylamine hydrochloride and removal of benezene under reduced pressure, the product solidifies. It is purified by recrystallization from benzene.

We claim:

1. Compounds of the group having the general formula:

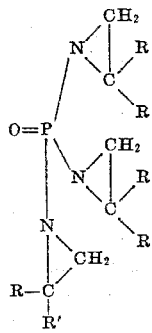

in which R is a lower alkyl radical and R' is an alkyl radical containing 1 to 8 carbon atoms, inclusive.

2. Compounds of the group having the general formula:

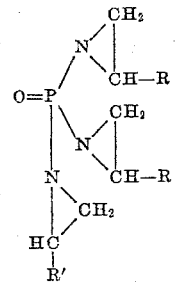

in which R is a lower alkyl radical and R' is an alkyl radical containing 1 to 8 carbon atoms, inclusive.

3. Compounds having the general formula:

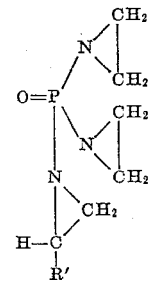

in which R' is an alkyl radical containing 1 to 8 carbon atoms, inclusive.

4. N,N',N''-tris-(1-methylethylene) phosphoric triamide.

5. N,N',N''-tris-(1,1-dimethylethylene) phosphoric triamine.

6. A method of preparing compounds having the formula:

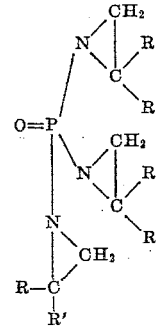

in which R is a lower alkyl radical and R' is an alkyl radical containing 1 to 8 carbon atoms, inclusive which comprises reacting a compound having the formula:

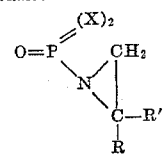

in which X is a halogen radical and R and R' are as defined above with a compound having the formula:

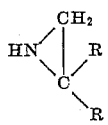

in which R is as defined above, and recovering said compound therefrom.

7. A method of preparing compounds having the formula:

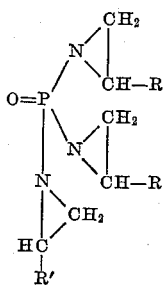

in which R is a lower alkyl radical and R' is an alkyl radical containing 1 to 8 carbon atoms, inclusive which comprises reacting a compound having the formula:

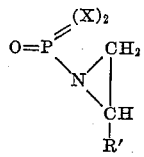

in which X is a halogen radical and R' is as defined above with a compound having the formula:

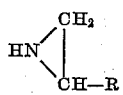

in which R is as defined above, and recovering said compound therefrom.

8. A method of preparing compounds having the formula:

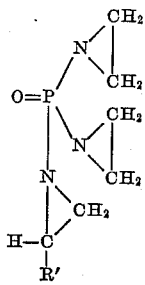

in which R' is an alkyl radical containing 1 to 8 carbon atoms, inclusive which comprises reacting a compound having the formula:

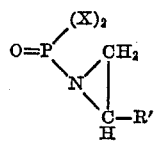

in which X is halogen and R' is as defined above, with ethylenimine and recovering said compound therefrom.

9. A method of preparing N,N',N''-tris-(1-methylethylene)phosphoric triamide which comprises reacting phosphorous oxychloride with 2-methylethylenimine in an aqueous alkaline solution and recovering said compound therefrom.

10. A method of preparing N,N',N''-tris-(1-1-dimethylethylene)phosphoric triamide which comprises reacting phosphorous oxychloride with 2,2-dimethylethylenimine in a hydrocarbon solvent in the presence of a tertiary amine and recovering said compound therefrom.

11. Compounds of the group having the general formula:

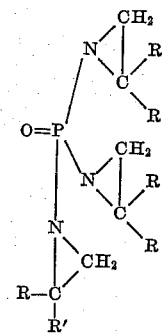

in which R is a member of the group consisting of hydrogen and lower alkyl radicals and R' is a member of the group consisting of alkyl radicals containing 1 to 8 carbon atoms inclusive and the phenyl radical.

12. A method of preparing compounds having the formula:

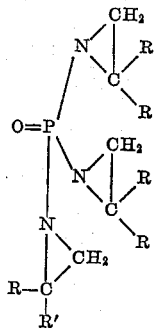

in which R is a member of the group consisting of hydrogen and lower alkyl radicals and R' is a member of the group consisting of alkyl radicals containing 1 to 8 carbon atoms inclusive and the phenyl radical, which comprises reacting a compound having the formula:

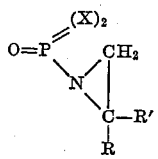

in which X is a halogen radical and R and R' are defined above with a compound having the formula:

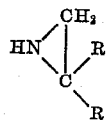

in which R is as defined above and recovering said compound therefrom.

ROBERT P. PARKER.
DORIS R. SEEGER.
ERWIN KUH.

REFERENCES CITED

The following references are of record in the file of this patent:

UNITED STATES PATENTS

| Number | Name | Date |
|---|---|---|
| 2,160,841 | Dreyfus | June 6, 1939 |